United States Patent
Mejri et al.

(10) Patent No.: US 9,948,364 B2
(45) Date of Patent: Apr. 17, 2018

(54) RECURSIVE SUB-BLOCK DECODING

(71) Applicant: INSTITUT MINES-TELECOM, Paris (FR)

(72) Inventors: Asma Mejri, Antibes (FR); Mohamed-Achraf Khsiba, Paris (FR); Ghaya Rekaya Ben-Othman, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/389,612

(22) Filed: Dec. 23, 2016

(65) Prior Publication Data
US 2017/0187432 A1 Jun. 29, 2017

(30) Foreign Application Priority Data
Dec. 28, 2015 (EP) .................................. 15307153

(51) Int. Cl.
*H04B 7/00* (2006.01)
*H04B 7/0413* (2017.01)
(Continued)

(52) U.S. Cl.
CPC ......... *H04B 7/0413* (2013.01); *H04B 7/0697* (2013.01); *H04L 1/04* (2013.01);
(Continued)

(58) Field of Classification Search
CPC . H04B 7/0413; H04B 7/0697; H04L 27/2649; H04W 84/042; H04W 84/12
See application file for complete search history.

(56) References Cited

U.S. PATENT DOCUMENTS 7,873,021 B2 * 1/2011 Petre ..................... H04B 7/04
370/342
9,325,533 B2 * 4/2016 Wicker, Jr. .......... H04L 25/0242
(Continued)

FOREIGN PATENT DOCUMENTS

EP 15306808.5 A1 5/2017

OTHER PUBLICATIONS

European Search Report for 15307153.5 dated Jul. 4, 2016.
(Continued)

*Primary Examiner* — Dac Ha
(74) *Attorney, Agent, or Firm* — Meagher Emanuel Laks Goldberg & Liao, LLP

(57) ABSTRACT

Embodiments of the invention provide a decoder for decoding a data signal received through a transmission channel in a communication system, said transmission channel being represented by an upper triangular matrix, said signal carrying transmitted symbols, each symbol carrying a set of information bits, wherein said decoder comprises:
  a processing unit (213) configured to determine at least one sub-block decoding parameter given a target quality of service metric;
  A sub-block decoding unit (214) configured to divide said data signal into a number of sub-vectors based on said at least one sub-block decoding parameter in accordance with a division of said upper triangular matrix into a number of sub-matrices, said sub-block decoding unit (214) being further configured to determine at least one estimate of each sub-vector of transmitted symbols from said sub-vectors, and determine an estimate of the transmitted symbols from said estimates.

24 Claims, 6 Drawing Sheets

(51) Int. Cl.
  H04B 7/06    (2006.01)
  H04L 27/26   (2006.01)
  H04L 1/04    (2006.01)
  H04L 1/06    (2006.01)
  H04L 25/03   (2006.01)
  H04W 84/04   (2009.01)
  H04W 84/12   (2009.01)

(52) U.S. Cl.
  CPC .............. H04L 1/06 (2013.01); H04L 25/03 (2013.01); H04L 27/2649 (2013.01); *H04W 84/042* (2013.01); *H04W 84/12* (2013.01)

(56) References Cited

U.S. PATENT DOCUMENTS

| | | | |
|---|---|---|---|
| 2005/0237971 A1* | 10/2005 | Skraparlis | H04B 7/0417 370/329 |
| 2006/0188044 A1* | 8/2006 | Wang | H04B 7/04 375/347 |
| 2009/0013641 A1 | 4/2009 | Masui et al. | |
| 2010/0042666 A1 | 2/2010 | Park et al. | |

OTHER PUBLICATIONS

Choi W-J et al., Combined ML and DFE Decoding for the V-BLAST System, ICC 2000. 2000 IEEE International Conference on Communications. Conference Record. New Orleans, LA, Jun. 18-21, 2000; [IEEE International Conference on Communications], New York, NY : IEEE, US, vol. 3, Jun. 18, 2000 (Jun. 18, 2000), pp. 1234-1248.

Viterbo et al., "A Universal Lattice Code Decoder for Fading Channels", IEEE Transactions on Information Theory, vol. 45, No. 5, pp. 1639-1642, Jul. 1999.

Fano, "A Heuristic Discussion of Probabilistic Decoding", IEEE Transactions on Information Theory, vol. 9, No. 2, pp. 64-74, Apr. 1963.

G.R. Ben-Othamn , "The spherical bound stack decoder", IEEE International Conference on Wireless & Mobile Computing, Networking & Communication, pp. 322-327, Oct. 2008.

A.K. Lenstra et al., "Factoring Polynomials with Rational Coefficients", Math. Ann., vol. 261, pp. 515-534, Jul. 11, 1982.

D. N. Dao et al., "Four-Group Decodable Space-Time Block Codes", IEEE Transactions on Signal Processing, vol. 56, No. 1, pp. 424-430, Jan. 2008.

T.P. Ren et al., "Group-Decodable Space-Time Block Codes with Code Rate > 1", IEE Transactions on Communications, vol. 59, No. 4, pp. 987-997, Apr. 2011.

E. Biglieri et al., "On Fast-Decodable Space-Time Block Codes", IEEE International Zurich Seminar on Communications, pp. 116-119, Mar. 18 2008.

J.M. Paredes et al., "A New Full-Diversity Space-Time Block Code With Nonvanishing Determinants and Simplified Maxium-Likelihood Decoding", IEEE Transactions on Signal Processing, vol. 56, No. 6, pp. 2461-2469, Jun. 2008.

T.P. Ren et al "Fast-Group-Decodable Space-Time Block Code", In Proceedings of IEEE Information Theory Workshop, pp. 1-5, Jan. 2010.

\* cited by examiner

RECURSIVE SUB-BLOCK DECODING

TECHNICAL FIELD

The invention generally relates to digital communication and in particular to methods and devices for decoding a data signal.

BACKGROUND

Transmission channels in wireless networks are subject to fading and interference caused by multiple paths crossed by transmitted signals. These effects lead to an information loss which disables the receiver from efficiently decoding the intended information packets. One solution to this problem consists of transmitting the same information through different links presenting different fading characteristics. Consequently, many replicas of the same signal may be available at the receiver. As a result, the receiver can use the replicas that are less affected by the transmission channel to reliably recover the desired messages.

Different diversity techniques may be used for providing many replicas of the same signal by exploiting different degrees of freedom such as time, space and frequency. Time and space diversity techniques are used for example in Multiple-Input Multiple-Output (MIMO) systems. Different replicas of the same signal may be provided using a multiplicity of antennas and/or a plurality of time slots. Frequency diversity is used for example in OFDM systems for providing different replicas using a plurality of orthogonal sub-carriers. Multipath diversity is used for example in Discrete Sequence-Code Division Multiple Access systems (DS-CDMA).

When different diversity techniques are used simultaneously, the global diversity order achieved by the system represents the product of the partial orders obtained by each technique separately. The global diversity order represents the number of independent replicas of original signals that are available at a receiver to decode the transmitted symbols. It characterizes the reliability of the communication system.

Some diversity techniques have significantly impacted the design of many successful communication systems, such as MIMO technologies. The combination of space and time diversity techniques allows increasing the system capacity.

MIMO technologies have been incorporated in several standards such as in wireless LANs (WiMAX IEEE 802.16) or cellular mobile networks (3G and 4G) and are applied in different applications such as cooperative communications involving relay stations equipped with multiple antennas.

One major challenge for MIMO systems is to adapt to increasing demands in terms of data rates for real-time services and applications. Another challenge is to implement low-complexity decoders at the receiver that are capable of offering the required quality of service while consuming low power and low computational resources.

A receiver device implements a decoding algorithm which delivers an estimation of the conveyed signal from the transmitter.

Several decoding algorithms exist and their practical use differs depending on the performance required in the quality of service (QoS) specifications and the available hardware resources, such as the computational and memory (storage) supplies. Optimal performances in terms of error rate and achievable diversity order can be obtained using a Maximum Likelihood (ML) decoding algorithm. The optimal achievable diversity order designates the maximum global diversity order offered by the communication system. Exemplary ML decoding algorithms include sequential lattice decoders such as:

- the Sphere Decoder disclosed in "E. Viterbo and J. Boutros. A universal lattice code decoder for fading channels. IEEE Transactions on Information Theory, 45(5):1639-1642, July 1999."
- the Stack decoder disclosed in "R. Fano. A heuristic discussion of probabilistic decoding. IEEE Transactions on Information Theory, 9(2):64-74, 1963", and
- the SB-Stack decoder disclosed in "G. R. Ben-Othman, R. Ouertani, and A. Salah. The spherical bound stack decoder. In Proceedings of International Conference on Wireless and Mobile Computing, pages 322-327, October 2008".

However, these decoders require a high computational complexity which can exceed the available resource. The complexity of sequential ML decoders increases as a function of:
- the number of deployed antennas at the transmitter and at the receiver, and
- the size of the constellations.

Sub-optimal decoders were also proposed with a reduced decoding complexity such as linear decoders including Zero-Forcing (ZF) and Minimum Mean Squared Error (MMSE) and non-linear Zero Forcing-Decision Feedback Equalizer (ZF-DFE) decoders. Although they require reasonable computational capabilities, these decoding algorithms offer limited performance and do not allow fully exploiting the full diversity offered by the communication system. Preprocessing techniques such as Lattice reduction and MMSE-GDFE preprocessing may be applied prior to decoding using such approaches to obtain better performance. An example of lattice reduction techniques is the LLL reduction disclosed in: "A. K. Lenstra, H. W. Lenstra, and L. Lovasz. Factoring Polynomials with Rational Coefficients. Math. Ann. Volume 261, pages 515-534, 1982".

A category of sub-block decoders exists. It refers to decoding approaches consisting in dividing the vector of information symbols into sub-vectors and decoding each sub-vector separately given a sub-block division of a representative channel state matrix and a corresponding sub-vector division of the received signal.

A sub-block decoder was disclosed in "Won-Joon Choi, R. Negi, and J. M. Cioffi. Combined ML and DFE decoding for the V-BLAST system. IEEE International Conference on Communications. Volume 3, pages 1243-1248, 2000". This decoder is based on a combined decoding scheme using both ML and DFE. According to this approach, the vector of information symbols of length n is divided into two sub-vectors of lengths p and n-p respectively. In a first decoding phase, the sub-vector composed of p information symbols is estimated using an ML decoder. Given these estimated symbols, the receiver iteratively performs inter-symbols interference cancellation using a decision feedback equalization to determine an estimation of the remaining n-p symbols composing the second sub-block of information symbols. Such a decoding scheme provides better performances than a joint decoding based on a ZF-DFE decoder. For example, the diversity order achievable under this scheme in a symmetric MIMO system using spatial multiplexing is equal to p while it is limited to 1 under ZF-DFE decoding.

Other sub-block decoding schemes have been proposed for Space-Time Coded MIMO systems using a linear Space-Time Block Code (STBC). Particular classes of low-complexity ML decodable STBC have been proposed such as the family of multi-group decodable codes disclosed in:

"D. N. Dao, C. Yuen, C. Tellambura, Y. L. Guan, and T. T. Tjhung. Four-group decodable space-time block codes. IEEE Transactions on Signal Processing, 56(1): 424-430, January 2008".

"T. P. Ren, Y. L. Guan, C. Yuen, E. Gunawan, and E. Y. Zhang. Group-decodable space-time block codes with code rate >1. IEEE Transactions on Communications, 59(4):987-997, April 2011".

Other classes of low-complexity ML decodable STBC comprise fast decodable codes disclosed in:

"E. Biglieri, Y. Hong, and E. Viterbo. On fast-decodable space-time block codes. In IEEE International Zurich Seminar on Communications, pages 116-119, March 2008".

"J. M. Paredes, A. B. Gershman, and M. Gharavi-Alkhansari. A new full-rate full-diversity space-time block code with nonvanishing determinants and simplified maximum-likelihood decoding. Signal Processing, IEEE Transactions on, 56(6):2461-2469, June 2008".

Another family of STBC codes referred to as "fast-group decodable codes" was disclosed in T. P. Ren, Y. L. Guan, C. Yuen, and R. J. Shen. Fast-group-decodable space-time block code. In Proceedings of IEEE Information Theory Workshop, pages 1-5, January 2010".

Sub-block decoding in the presence of an STBC that belongs to one of these families of codes may be advantageously performed using the QR decomposition of the channel state matrix. Accordingly, the zero structure of the equivalently obtained transmission channel representative matrix allows recursive decoding of the various sub-vectors of information symbols with reduced complexity without sacrificing the decoding error performance. Particularly, some sub-vectors of symbols may be estimated in a separately in parallel allowing for faster and lower-complexity decoding. Different or similar decoding schemes may be used to determine each estimate of the sub-vector of information symbols.

Although existing sub-block decoding methods offer better performance than sub-optimal linear and non-linear decoding schemes, they require higher computational complexity.

SUMMARY

To address these and other problems, there is provided a decoder for sub-block decoding a data signal received through a transmission channel in a communication system. The transmission channel is represented by an upper triangular matrix. The data signal carrying transmitted symbols, each symbol carrying a set of information bits. The decoder comprises:

a processing unit configured to determine at least one sub-block decoding parameter given a target quality of service metric;

a sub-block decoding unit configured to divide the data signal into a number of sub-vectors based on the determined at least one sub-block decoding parameter in accordance with a division of the upper triangular matrix into a number of sub-matrices. The sub-block decoding unit being further configured to determine at least one estimate of each sub-vector of transmitted symbols from the divided sub-vectors, and determine an estimate of the transmitted symbols from the at least one estimate of each sub-vector of information symbols.

In one embodiment, the target quality of service metric may be chosen among a group consisting of the diversity order, symbol error rate and the channel outage capacity.

In one embodiment, the decoder may comprise a storage unit configured to store a look-up table comprising a set of values. The processing unit may be configured to determine the at least one sub-block decoding parameter from the set of values.

In a particular embodiment, the storage unit may be configured to update the look-up table from a set of quality of service measurements in response to a temporal condition.

According to certain embodiments, the temporal condition may be chosen among a group consisting of a period and a sliding window.

In certain embodiments, the processing unit is further configured to determine a quality of service indicator based on a comparison between a measured quality of service metric and a target quality of service metric. The quality of service indicator having a value among a first value and a second value. The processing unit may be further configured to update the target quality of service metric depending on the value of the quality of service indicator. In such embodiments, the processing unit may be configured to update the at least one sub-block decoding parameter in response to the update of the target quality of service metric.

In one embodiment, the processing unit may be configured to decrease the target quality of service metric if the quality of service indicator has the first value and to increase or maintain the target quality of service metric if the quality of service indicator has the second value.

In one embodiment, the quality of service indicator may be a binary indicator.

In certain embodiments, the at least one sub-block decoding parameter may comprise at least one parameter chosen among a group consisting of a number of sub-blocks being greater than or equal to two, the length of each sub-block and the decoding algorithm implemented in each sub-block.

In one embodiment, the sub-block decoding unit may be configured to determine estimates of the sub-vectors of information symbols using similar or different decoding algorithms. A decoding algorithm may be chosen in a group consisting of a sequential decoding algorithm, a ZF decoding algorithm, a ZF-DFE decoding algorithm or an MMSE decoding algorithm.

In certain embodiments, the sub-block decoding unit may be further configured to perform a preprocessing using at least one of a lattice reduction and MMSE-GDFE filtering.

In certain embodiments, the sub-block decoding unit may be configured to determine a plurality of estimates of each sub-vector of information symbols for delivering soft-output decisions on the set of information bits carried by the information symbols.

The invention also provides a receiver for receiving and decoding a vector of transmitted information symbols. The receiver comprises a decoder according to any preceding feature for decoding a signal of transmitted symbols.

In one application of the invention in wireless multiple-input multiple-output communication systems, there is provided a wireless device capable of receiving data. The wireless device comprises a receiver for receiving and decoding a vector of transmitted information symbols according to any of the preceding embodiments.

In one application of the invention in optical multiple-input multiple output communication systems, there is provided an optical device capable of receiving data. The optical device comprises a receiver for receiving and decoding a vector of transmitted information symbols according to any of the preceding embodiments.

There is also provided a method of decoding a data signal received through a transmission channel in a communication system. The transmission channel being represented by an upper triangular matrix. The data signal carrying transmitted symbols, each symbol carrying a set of information bits, the method comprising:
determining at least one sub-block decoding parameter given a target quality of service metric;
dividing the data signal into a number of sub-vectors based on the determined at least one sub-block decoding parameter in accordance with a division of the upper triangular matrix into a number of sub-matrices, determining at least one estimate of each sub-vector of transmitted symbols from the divided sub-vectors, and determining an estimate of the transmitted symbols from the determined at least one estimate of each sub-vector of transmitted symbols.

There is also provided a computer program product for decoding a data signal received through a transmission channel in a communication system. The transmission channel being represented by an upper triangular matrix. The data signal carrying transmitted symbols, each symbol carrying a set of information bits, the computer program product comprising:
a non-transitory computer readable storage medium; and instructions stored on the non-transitory computer readable storage medium that, when executed by a processor, cause the processor to:
determine at least one sub-block decoding parameter given a target quality of service metric;
divide the data signal into a number of sub-vectors based on the determined at least one sub-block decoding parameter in accordance with a division of the upper triangular matrix into a number of sub-matrices, determine at least one estimate of each sub-vector of transmitted symbols from the divided sub-vectors, and determine an estimate of the transmitted symbols from the determined at least one estimate of each sub-vector of transmitted symbols.

Advantageously, the various embodiments of the present invention allow a receiver device to decode intended data streams with reduced complexity while achieving desired target quality of the service specifications.

Further advantages of the present invention will become clear to the skilled person upon examination of the accompanying drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
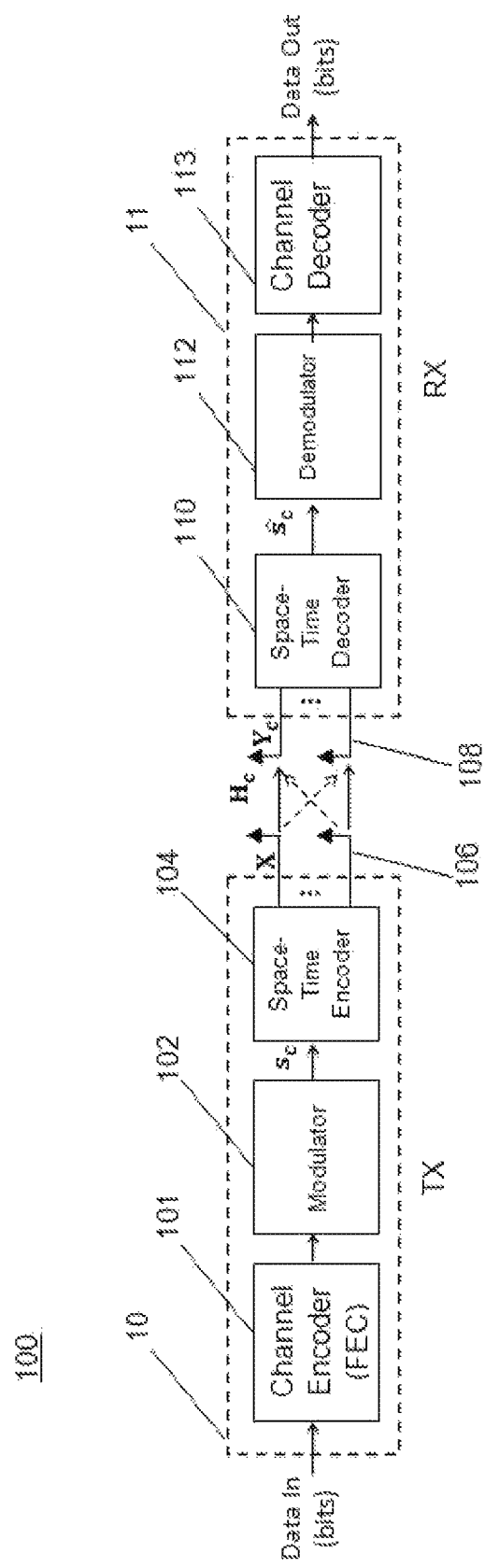
FIG. 1 is a block diagram representing the structure of a Multiple-Input Multiple-Output communication system implementing certain embodiments of the invention.

Embodiments of the invention provide methods, devices and computer program products for decoding a data signal transmitted by a transmitter device over a communication channel and which is received by a receiver device. Embodiments of the present invention are based on a division of the data signal into sub-vectors and a corresponding division of a transmission channel representative matrix into a number of sub-matrices. An optimized division of the data signal is achieved by determining the number and lengths of the divided sub-vectors adapted to a target quality of the service specifications.

Methods, devices and computer programs according to the various embodiments of the invention may be implemented in communication systems accommodating at least one transmitter device (also referred to hereinafter as "transmitter") for transmitting a plurality of information symbols, and at least a receiver (also referred to hereinafter as "receiver") for receiving and decoding the transmitted information symbols by one or more transmitter devices.

Transmitter devices are equipped with one or more transmit antenna and receiver devices are equipped with one or more receive antenna.

The communication system may be a wireless single-user MIMO system in which a wireless multi-antenna transmitter communicates a flow of information symbols representing an input data with a wireless multi-antenna receiver configured to decode the conveyed symbols by the transmitter.

The communication system may be a wireless multi-user MIMO system in which a plurality of wireless transmitter devices and receiver devices communicate with each other. In this case, the communication system may use any multiple access techniques such as Time Division Multiple Access (TDMA), Space-Division Multiple Access (SDMA), CDMA or Frequency Division Multiple Access (FDMA).

The communication system may be an optical fiber-based communication system. The received signal may accordingly correspond to the information symbols transmitted through the different polarization states of the optical fiber or propagating over the different modes of multi-mode fibers. In addition, a multiple access technique such as WDMA may be used in such optical communication systems.

The communication channel may be any linear Additive White Gaussian Noise (AWGN) channel or a multipath channel using single-carrier or multi-carrier modulation formats such as OFDM and Filter Bank Multicarrier (FBMC).

In a preferred embodiment of the present invention, the complexity of sub-block decoding of a signal transmitted over a wireless single-user MIMO communication system is reduced while meeting a specified target QoS specification. Exemplary applications of the sub-block decoding methods and devices include, with no limitation, MIMO decoding in configurations implementable in wireless standards such as the WiFi (IEEE 802.11n), the cellular WiMax (IEEE 802.16e), the cooperative WiMax (IEEE 802.16j), the Long Term Evolution (LTE), the LTE-advanced and the 5G ongoing standardization.

For illustration purpose only, the following description will be made with reference to a wireless single-user MIMO system accommodating a transmitter equipped with $n_t \geq 1$ transmit antennas and a receiver equipped with $n_r \geq 1$ receive antennas for decoding information symbols sent by the transmitter. However, the skilled person will readily understand that the various embodiments of the invention apply in other communication systems such as distributed MIMO systems and optical MIMO systems. Generally, the invention may be integrated in any communication system characterized by a lattice representation of the channel output at receiver devices.

Referring to FIG. 1, an exemplary wireless communication system 100 is illustrated. The MIMO system accommodates a transmitter implementing a Space Time Block Code (STBC) to distribute the symbols modulated over time and space dimensions. Each transmitter 10 of a station may exchange data with a receiver 11 of another station according to the wireless communication system 100.

The MIMO system may present a symmetric configuration, in which case the transmitter device and the receiver device are equipped with the same number of antennas $n_t=n_r$. Alternatively, the MIMO configuration may be asymmetric, in which case the number $n_r$ of receive antennas differs from the number $n_t$ of transmit antennas, particularly, in order to avoid a rank deficiency problem, the number $n_r$ of receive antennas is larger than the number $n_t$ of antennas at the transmitter.

The transmitter 10 can convey a signal to a receiver 11 over a noisy wireless MIMO channel. The transmitter 10 can be implemented, and not limited to, in a user equipment, a mobile station or any device capable of operating in a wireless environment. The transmitter device may be fixed or mobile. The transmitter 10 may comprise for example:
- a channel encoder 101 implementing a Forward Error Correction (FEC) code such as block codes or convolutional codes;
- a modulator 102 implementing a modulation scheme such as Quadrature Amplitude Modulation (QAM) delivering a modulated symbols vector $s_c$;
- a Space-Time encoder 104 for delivering a codeword matrix X;
- $n_t$ transmit antennas 106, each transmit antenna being associated with an OFDM or FBMC modulator.

The transmitter 10 encodes a received flow of information bits as data input using a FEC encoder 101 implementing for example a convolutional code. The encoded binary signal is then modulated into a symbols vector $s_c$ using the modulator 102. Different modulation schemes may be implemented such as $2^q$-QAM or $2^q$-PSK with $2^q$ symbols or states. The modulated vector $s_c$ is a complex-value vector comprising $\kappa$ complex-value symbols $s_1, s_2, \ldots, s_k$ with q bits per symbol. An information symbol $s_j$ has a mean power $E_s$, and can be written in the form:

$$s_j = Re(s_j) + iIm(s_j) \quad (1)$$

In equation (1) i denotes the complex number such that $i^2 = -1$ and the Re(.) and Im(.) operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A=[-(q-1),(q-1)]$. The minimum distance $d_{min}$ of the modulation scheme represents the Euclidean distance between two adjacent points in the constellation and is equal to 2.

A Space-Time Encoder 104 may be used to generate a codeword matrix X from encoded symbols. The Space-Time encoder 104 may use a linear STBC of length T. It delivers in this case a codeword matrix X of dimension $n_t \times T$ that belongs to a codebook C and sent over T time slots. The coding rate of such codes is equal to $\kappa/T$ complex symbols per channel use. $\kappa$ denotes the number of encoded complex-valued symbols composing the vector $s_c = [s_1, s_2, \ldots, s_\kappa]^t$ of dimension $\kappa$ in this case. When full rate codes are used, the Space-Time Encoder 104 encodes $\kappa = n_t T$ complex-valued symbols. An example of STBC is the Perfect Codes. They are known to be optimal by providing full coding rates encoding $\kappa = n_t^2$ ($T=n_t$) complex information symbols and satisfying a non-vanishing determinant property.

The Space-Time Encoder 104 may use a spatial multiplexing scheme known as V-BLAST scheme by multiplexing the received complex-valued information symbols over the different transmit antennas without performing a coding in the time dimension.

The codeword so constructed may be converted from the time domain to the frequency domain using a multicarrier modulation technique, using for example OFDM or FBMC modulators, and spread over the transmit antennas 106. Signals are sent from the transmit antennas 106 optionally after filtering, frequency transposition and amplification.

The receiver 11 may be configured to receive and decode a signal communicated by the transmitter 10 in a wireless network through a communication channel subject to fading and interference. The communication channel may be represented by a complex-valued channel matrix 14. In addition, the communication channel may be noisy, affected for example by a Gaussian Noise.

The receiver 11 may be integrated in a base station such as a Node-B in a cellular network, an access point in a local area network or ad-hoc networks or any other interfacing device operating in a wireless environment. The receiver 11 may be fixed or mobile. In one exemplary embodiment, the receiver 11 may comprise:
- a Space-Time decoder 110 configured to deliver, from the channel matrix $H_c$ and the channel output signal $Y_c$ an estimation $\hat{s}_c$ of the modulated symbols vector $s_c$;
- a demodulator 112 configured to generate a binary sequence by performing a demodulation of the estimated symbols vector $\hat{s}_c$;
- a channel decoder 113 configured to deliver a binary signal as estimation of the transmitted bits as output using for example the Viterbi algorithm.

The receiver 11 implements a reverse processing of the processing performed in the transmitter 10. Accordingly, if a single-carrier modulation is used at the transmitter rather than a multi-carrier modulation, the $n_r$ OFDM or FBMC demodulators are replaced by corresponding single-carrier demodulators.

Figure 2:
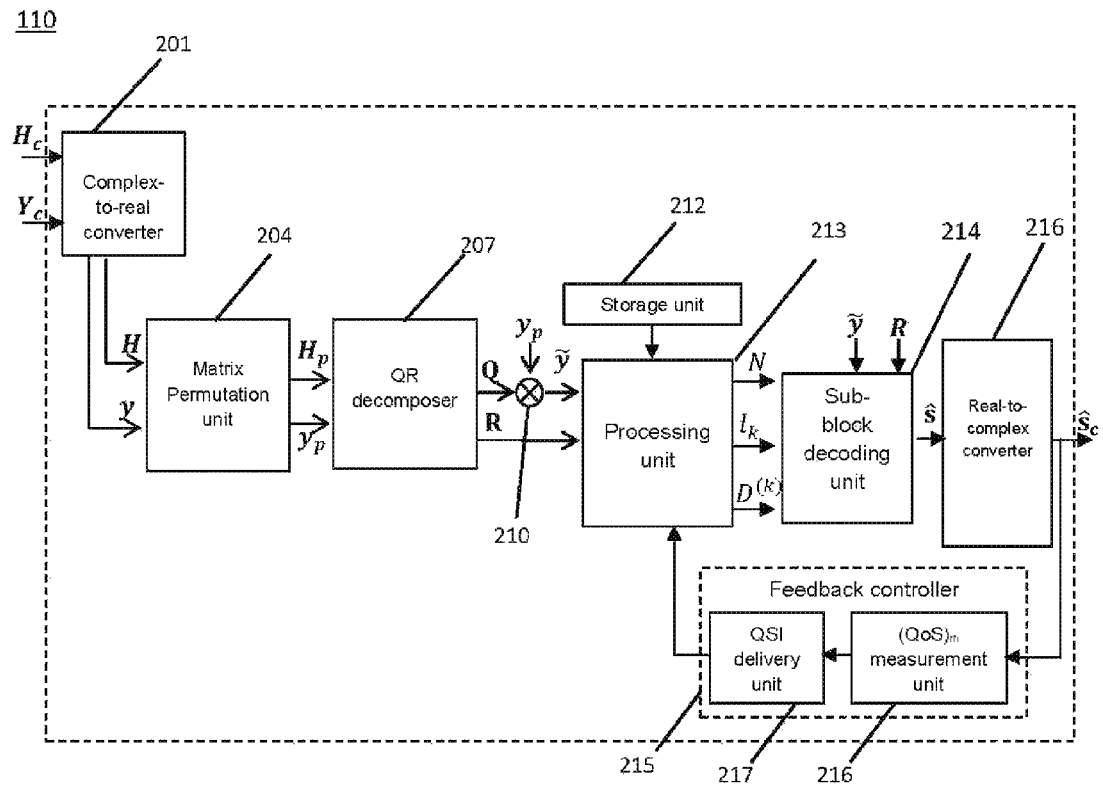
FIG. 2 is a block diagram representing the structure of a Space-Time decoding device according to an exemplary embodiment of the present invention.

Referring to FIG. 2, a structure of a Space-Time decoder 110 according to certain embodiments of the invention, is illustrated. Accordingly, the Space-Time decoder 110 may comprise a complex-to-real converter 201 configured to convert the complex-valued channel matrix $H_c$ into a real-valued equivalent channel matrix H, and convert the complex-valued channel output $Y_c$ into a real-valued vector y.

In certain embodiments, the Space-Time decoder 110 may comprise a matrix permutation unit 204 configured to generate a permutation matrix P. This permutation matrix may be used to determine a permuted matrix $H_p$ obtained by permuting the columns or rows of the equivalent channel matrix H. Columns and rows permutation may be realized by multiplying the equivalent channel matrix by the permutation matrix in the left and the right side respectively. The Space-Time decoder 110 may further comprise a QR decomposer 207 configured to perform a QR decomposition of the equivalent channel matrix (or permuted equivalent channel matrix in certain embodiments) such that H=QR. Q is an orthogonal matrix and R is an upper triangular matrix. The Space-Time decoder 110 may further comprise a multiplication unit 210 configured to compute the signal ỹ by scaling the real-valued signal y by the transpose of the matrix Q. The Space-Time decoder 110 may further comprise a processing unit 213 configured to determine a set of sub-block decoding parameters given a value of a target quality of service metric $(QoS)_t$. The sub-block decoding parameters comprise at least the number N of sub-blocks, a set of lengths $l_k$, $k=1, \ldots, N$ satisfying $\Sigma_{k=1}^{N} l_k = N$, and a set of decoding algorithms $D^{(k)}$, $k=1, \ldots, N$. The decoding algorithms may be similar or different.

The Space-Time decoder 110 may further comprise a sub-block decoding unit 214 configured to deliver an estimate of the real and imaginary parts of the information symbols composing the vector ŝ. The Space-Time decoder 110 may further comprise a real-to-complex convertor 216 configured to deliver an estimate of the complex-valued transmitted signal by converting the real-valued vector 215 ŝ into a complex-valued vector $ŝ_c$. The conversion operation is the inverse of the processing performed at the complex-to-real converter 201.

In certain embodiments, the Space-Time decoder 110 may comprise a storage unit 212 configured to store selected set of values of a target quality of service metric $(QoS)_t$ and its corresponding sub-block decoding parameters.

In certain embodiments, the Space-Time decoder 110 may comprise a feedback controller 215 configured to dynamically update the value of a target $(QoS)_t$ metric. The feedback controller module may comprise a quality of service measurement unit 216 and a quality of service indicator delivery unit 217.

Even if not limited to such applications, the invention has certain advantages in recursive sub-block decoding applications. The following description will be made with reference to an application to recursive sub-block decoding for illustration purpose only.

Figure 3:
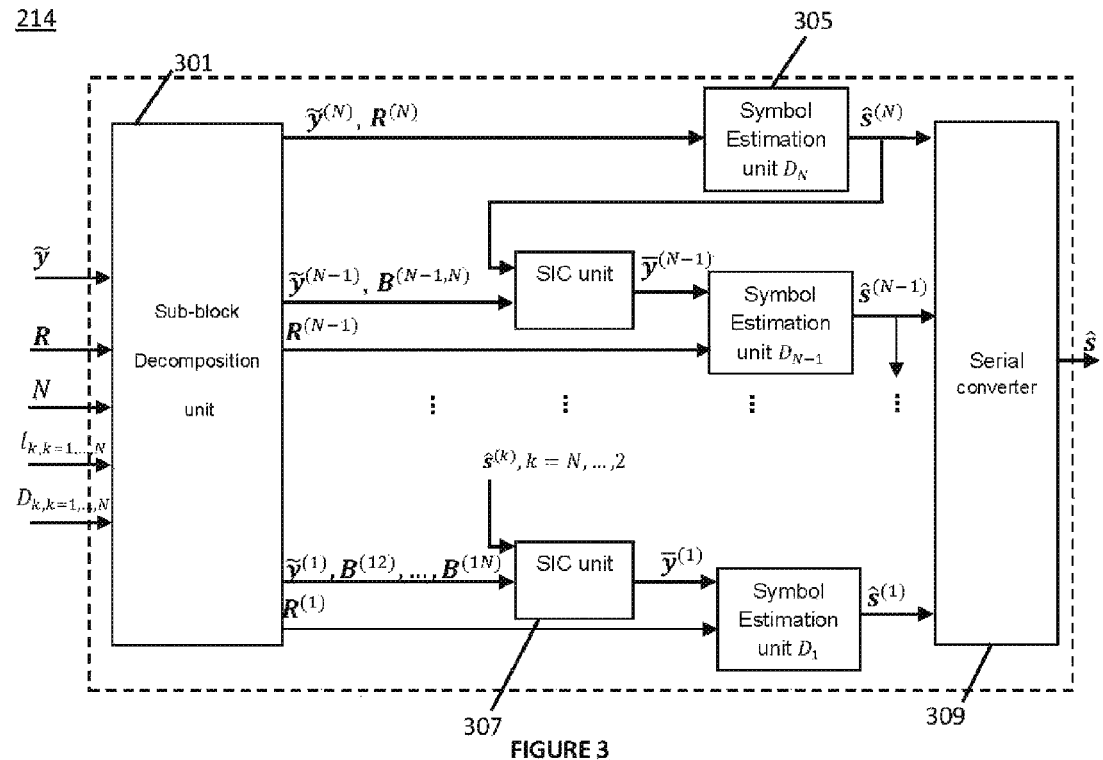
FIG. 3 is a block diagram representing the structure of a sub-block decoding device according to an exemplary embodiment of the present invention.

Referring to FIG. 3, there is illustrated a structure of the sub-block decoding unit 214 according to certain embodiments applied to perform recursive sub-block decoding. The sub-blocks decoding unit 214 may comprise a sub-blocks decomposition unit 301 configured to:
divide the vectors s and $Q^t y$ into sub-vectors $s^{(k)}$ and $ỹ^{(k)}$ respectively, for $k=1, \ldots, N$. A sub-vector of index k has a length $l_k$, and
decompose the upper triangular matrix R into $$N + \frac{N(N+1)}{2}$$

sub-matrices composed of N upper triangular sub-matrices $R^{(k)}$ and $$\frac{N(N+1)}{2}$$

rectangular sub-matrices $B^{(kj)}$ for $j=k+1, \ldots, N$; $k=1, \ldots, N$.

Using the sub-vectors $s^{(k)}$ and $ỹ^{(k)}$ and the decomposed sub-matrices $R^{(k)}$ and $B^{(kj)}$, a set of sub-blocks $(SB)_k$ may be defined for each index $k=1, \ldots, N-1$ such that $(SB)_k = \{l_k, s^{(k)}, R^{(k)}, ỹ^{(k)}, w̃^{(k)}, D^{(k)}, B^{(kj)}, j=k+1, \ldots, N\}$. For k=N, the corresponding sub-block is given by $(SB)_N = \{l_N, s^{(N)}, R^{(N)}, ỹ^{(N)}, w̃^{(N)}, D^{(N)}\}$.

The sub-block decoding unit 214 may further comprise N symbol estimation unit 305 and N−1 successive interference cancellation (SIC) unit 307. A SIC unit 305 associated to a sub-block $(SB)_k = \{l_k, s^{(k)}, R^{(k)}, ỹ^{(k)}, w̃^{(k)}, D^{(k)}, B^{(kj)}, j=k+1, \ldots, N\}$ is configured to calculate an interference-free vector $ȳ^{(k)}$. A symbol estimation unit 305 associated to a sub-block $(SB)_k$ is configured to generate at least an estimate $ŝ^{(k)}$ using the corresponding decoding algorithm $D^{(k)}$. The sub-block decoding unit 214 may further comprise a serial converter 309 configured to constitute the real-valued vector $ŝ = [ŝ^{(1)}, ŝ^{(2)}, \ldots, ŝ^{(N)}]^t$ by aggregating the outputs of the N symbol estimation units 305.

The skilled person will readily understand that the invention is not limited to the use of a symbol estimation unit 305 for each sub-block. Alternatively, a unique symbol estimation unit 305 or a set of symbol estimation units 305 (the set comprising less units than the total number of sub-blocks) may be used to determine the estimate of each sub-block.

In one application of the present invention to a wireless Rayleigh fading multiple antenna system to decode a signal sent from a transmitter equipped with $n_t$ transmit antennas using a V-BLAST spatial multiplexing scheme and $2^q$-QAM modulations, to a receiver equipped with $n_r$ receive antennas with $n_r \geq n_t$, the received complex-valued signal is written in the form:

$$y_c = H_c s_c + w_c \quad (2)$$

In equation (2) $y_c$ is an $n_r$-dimensional vector, $s_c$ denotes the complex-valued transmitted information symbols vector of dimension $n_t$. The complex-valued $n_r \times n_t$ matrix $H_c$ represents the channel matrix composed of the fading gains. In a Rayleigh fading channel, the entries of the channel matrix $H_c$ are independent identically distributed (i.i.d.) complex Gaussian. The channel matrix may be known or estimated in coherent transmissions at the receiver using estimation techniques. In addition to the multipath fading effect, the transmission channel may be noisy. The noise may result from thermal noises of the system components, inter-user interference and intercepted radiations by antennas. The total noise may be modeled by a zero-mean Additive White Gaussian Noise (AWGN) of variance $\sigma^2$ per real-valued dimension modeled in equation (2) by the $n_r$-dimensional complex-valued vector $w_c$.

In another application of the invention to coded systems using a linear STBC to encode a modulated symbol vector $s_c$ of κ complex-valued symbols, the received signal is an $n_r \times T$ matrix $Y_c$ written in the complex-valued form as:

$$Y_c = H_c X + W_c \quad (3)$$

In such an embodiment, the noise is represented by the $n_r \times T$ complex-valued matrix $W_c$ of Gaussian i.i.d. zero-mean entries of variance $\sigma^2$ per real and imaginary parts.

Given the channel output, the receiver attempts to generate an estimate of the original vector of information symbols.

Figure 4:
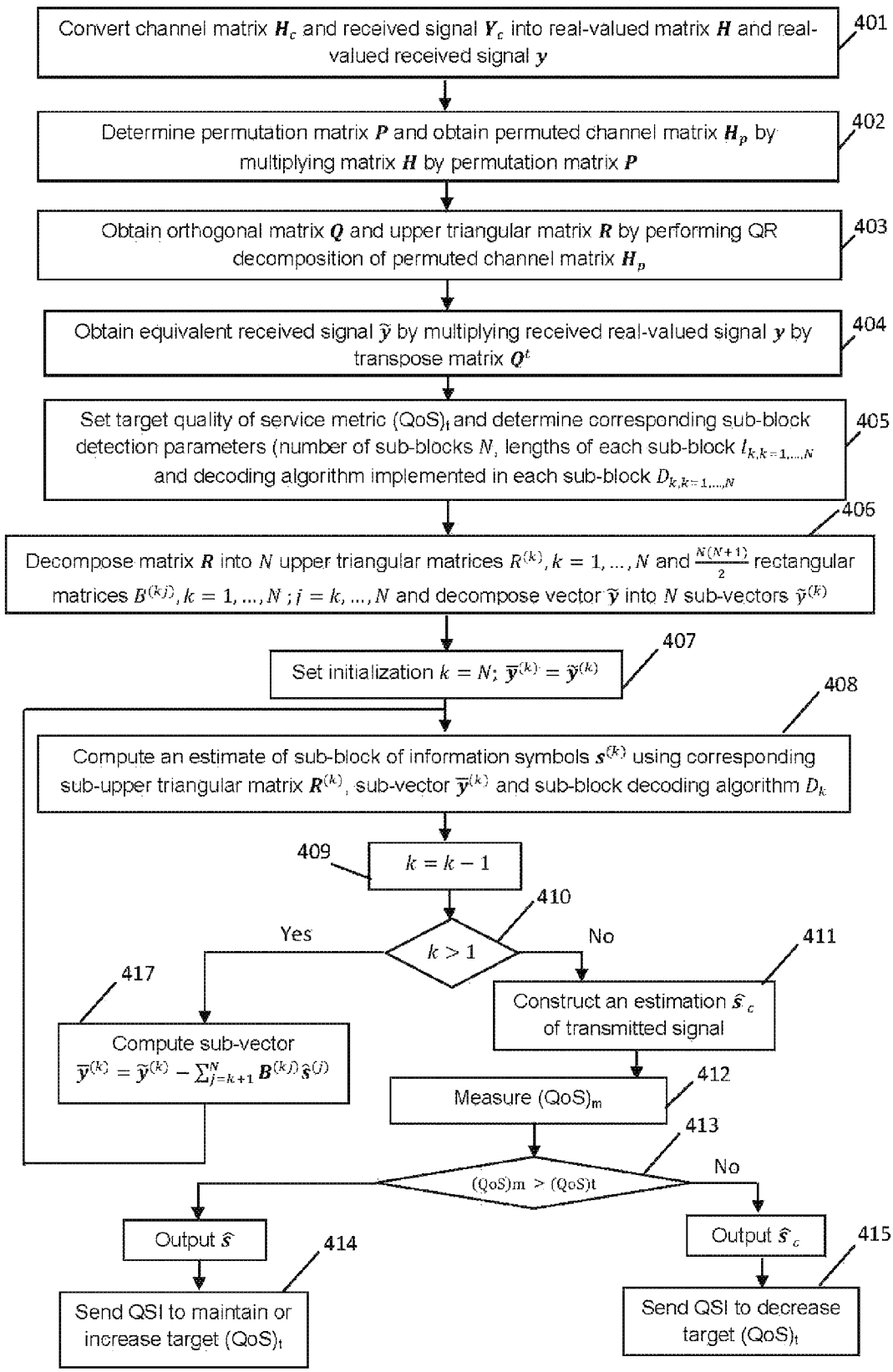
FIG. 4 is a flow diagram of a method of sub-block decoding according to an exemplary embodiment of the present invention.

FIG. 4 is a flowchart depicting the decoding method according to certain embodiments and according to a recursive sub-block decoding applications.

In step 401, a complex-to-real conversion may be performed to determine a real-value system of the received signal. Accordingly, for example in one embodiment using a spatial multiplexing scheme, the system in equation (2) may be transformed into:

$$y = \begin{bmatrix} \text{Re}(y_c) \\ \text{Im}(y_c) \end{bmatrix} = \begin{bmatrix} \text{Re}(H_c) & -\text{Im}(H_c) \\ \text{Im}(H_c) & \text{Re}(H_c) \end{bmatrix} \begin{bmatrix} \text{Re}(s_c) \\ \text{Im}(s_c) \end{bmatrix} + \begin{bmatrix} \text{Re}(w_c) \\ \text{Im}(w_c) \end{bmatrix} \quad (4)$$

The Re(.) and Im(.) operators in equation (4) output the real and imaginary parts of each element composing the underlying vector or matrix.

Equation (4) can be written in a lattice representation form as:

$$y = Hs + w \quad (5)$$

In another embodiment using a linear Space-Time Block code of length T and encoding κ symbols, the real-value expression of the channel output can be written in the lattice representation form of equation (5). The equivalent channel matrix in this case is the real-value $2n_rT \times 2\kappa$ matrix $H_{eq}$ given by:

$$H_{eq} = (I_T \otimes H)G \quad (6)$$

The $2n_rT \times 2\kappa$ matrix G is a real-valued matrix known as a generator matrix or coding matrix of the linear Space-Time Block code. $I_T$ denotes the identity matrix of dimension T and the operator $\otimes$ is the Kronecker matrices product.

In one application of the invention to asymmetric MIMO configurations with $n_t < n_r$, a lattice representation in the form of equation (5) can also be obtained by performing the complex-to-real conversion of step 401 to the equivalent system to equation (5) given by:

$$U^\dagger y_c = DV^\dagger s_c + U^\dagger w_c \quad (7)$$

The matrices U and V are unitary obtained, together with matrix D, from the singular value decomposition of the matrix $H_c = UDV^t$. D is diagonal having positive diagonal entries representing the singular values of the matrix $H_c$.

Both spatial multiplexing and Space-Time Block coded symmetric and asymmetric MIMO schemes permit similar real-value lattice representations of the channel output given in equation (5). To facilitate the understanding of the following embodiments, the following description will be made with reference to a spatial multiplexing scheme and involving a symmetric MIMO configuration where the transmitter and receiver are equipped with the same number of antennas $n_t = n_r$. Accordingly, the real-value vectors y, s and w in equation (5) will be represented as n-dimensional vectors with $n = 2n_t = 2n_r$ and the equivalent real-value channel matrix H will be a square n×n matrix. The vector s is composed of the real and imaginary parts of the original complex information symbols composing the vector $s_c$.

Step 402 may be performed in certain embodiments of the invention. Accordingly, a permutation matrix P may be determined to perform a permutation of the row vectors or column vectors of the channel matrix H. A permutation matrix is an orthogonal n×n matrix of binary entries. In an embodiment where the matrix permutation module 204 is configured to perform a permutation π of m row vectors of the equivalent channel matrix, the permutation matrix P has all entries equal to 0 except that in row t, the entry π(t) is equal to 1. A corresponding permuted channel matrix $H_p$ may be computed by multiplying the equivalent channel matrix from the left side by the permutation matrix according to:

$$H_p = PH \quad (8)$$

In such an embodiment, the received signal is also multiplied by the permutation matrix to obtain an equivalent system to equation (5) given by:

$$y_p = Py = PHs + Pw = H_p s + w_p \quad (9)$$

In equation (9), $w_p$ denotes a permuted noise vector and $y_p$ denotes a permuted received vector.

In an embodiment where the matrix permutation module 204 is configured to perform a permutation π of m of column vectors of the equivalent channel matrix, the permutation matrix P has all entries equal to 0 except that in row t, the entry π(t) is equal to 1. The corresponding permuted equivalent channel matrix $H_p$ may be computed by multiplying the equivalent channel matrix from the right side by the permutation matrix according to:

$$H_p = HP \quad (10)$$

In such embodiment, the vector of real-valued symbols s is multiplied by the transpose of the permutation matrix to obtain an equivalent system to equation (5) given by:

$$y = HPP^t s + w = H_p s_p + w \quad (11)$$

The following description of certain embodiments will be made with reference to a decoding method implemented without a permutation step.

In step 403, a QR decomposition of the channel matrix (permuted channel matrix in certain embodiments) may be performed such that H=QR. Q is an n×n orthogonal matrix and R is an n×n upper triangular matrix. Given the orthogonality of matrix Q, a multiplication of the system in equation (5) may be performed in step 404 to determine the equivalent received signal $\tilde{y}$ and the equivalent system according to:

$$\tilde{y} = Q^t y_p = Rs + \tilde{w} \quad (12)$$

The real-value equivalent system in equation (12) is considered for the estimation of the originally transmitted information symbols.

Optimal decoding performance is obtained using optimal ML decoding according to the ML decoding problem given by:

$$\hat{s}_{ML} = \text{argmin}_{s \in A^n} \|\tilde{y} - Rs\|^2 \quad (13)$$

In equation (13), $A = [c_{min}, c_{max}]$ designates the alphabet to which belong the real and imaginary parts of the complex-valued vector $s_c$ composing the real vector s.

An ML metric may be defined as:

$$m(s) = \|\tilde{y} - Rs\|^2 \quad (14)$$

In one application of the invention to recursive sub-block decoding, a sub-block decoding may be performed to recover an estimation of the original information symbols.

Accordingly, in step 405, a set of sub-block decoding parameters may be determined for a given a target quality of service metric $(QoS)_t$ metric. The sub-block decoding parameters comprise at least a number of sub-blocks N at least equal to 2, a set of lengths $l_{k,k=1,\ldots,N}$ satisfying $\Sigma_{k=1}^N l_k = N$, and a set of decoding algorithms $D^{(k)}, k=1,\ldots,N$. The lengths $l_{k, k=1,\ldots,N}$ may be equal or different. The decoding algorithms may be similar or distinct.

In step 406, a division of the upper triangular matrix R into sub-blocks and a division of the vector $\tilde{y}$ into sub-vectors may be performed. Accordingly, the vector $\tilde{y}$ is divided into N sub-vectors $\tilde{y}^{(k)}$, k=1, ..., N of lengths $l_k$ such that $$\tilde{y} = \begin{bmatrix} \tilde{y}^{(1)} \\ \vdots \\ \tilde{y}^{(N)} \end{bmatrix}.$$

The same vector division may be applied to the vector of symbols s and to the noise vector w to determine the sub-vectors $s^{(k)}$ and $w^{(k)}$ each of corresponding lengths $$l_k \text{ such that } = \begin{bmatrix} s^{(1)} \\ \vdots \\ s^{(N)} \end{bmatrix} \text{ and } w = \begin{bmatrix} w^{(1)} \\ \vdots \\ w^{(N)} \end{bmatrix}.$$

The upper triangular matrix may be divided into $$N + \frac{N(N+1)}{2}$$

matrices composed of N upper triangular matrices $R^{(k)}$, k=1, ..., N and $$\frac{N(N+1)}{2}$$

rectangular matrices $B^{(j,k)}$, k=1, ..., N; j=k, ..., N such that:

$$R = \begin{bmatrix} R^{(1)} & \cdots & B^{(1,N-1)} & B^{(1,N)} \\ 0 & \cdots & \vdots & \vdots \\ 0 & 0 & R^{(N-1)} & B^{(N-1,N)} \\ 0 & 0 & 0 & R^{(N)} \end{bmatrix} \quad (15)$$

A divided upper triangular sub-matrix $R^{(k)}$, k=1, ..., N is a square matrix of dimension $l_k \times l_k$.

A divided sub-matrix $B^{(k,j)}$, k=1, ..., N; j=k+1, ..., N is a rectangular matrix of dimension $l_k \times l_j$ and corresponds to the inter-symbols interference between the sub-blocks of symbols $s^{(k)}$ and $s^{(j)}$.

The divided sub-matrices, divided sub-vectors and sub-blocks decoding parameters may be grouped into sub-blocks $(SB)_k$, k=1, ..., N. A sub-block $(SB)_k$, fork ranging from 1 to N−1, may be defined as $(SB)_k = \{l_k, s^{(k)}, R^{(k)}, \tilde{y}^{(k)}, \tilde{w}^{(k)}, D^{(k)}, B^{(k,j)}, j=k+1, ..., N\}$ where $$\tilde{y}^{(k)} = R^{(k)}s^{(k)} + \Sigma_{j=k+1}^N B^{(k,j)}s^{(k)} + \tilde{w}^{(k)} \quad (16)$$

For k=N, the sub-block $(SB)_N$ is given by $(SB)_N = \{l_N, s^{(N)}, R^{(N)}, \tilde{y}^{(N)}, \tilde{w}^{(N)}, D^{(N)}\}$ such that:

$$\tilde{y}^{(N)} = R^{(N)}s^{(N)}\tilde{w}^{(N)} \quad (17)$$

Systems in equations (16) and (17) may be used for the decoding of the various sub-vectors of information symbols.

According to such groups of sub-blocks, the ML decoding metric in equation (14) may be written as:

$$m(s) = \|\tilde{y} - Rs\|^2 = \|\Sigma_{k=1}^N \tilde{y}^{(k)} - (R^{(k)}s^{(k)} + \Sigma_{j=k+1}^N B^{(k,j)}s^{(j)})\|^2 \quad (18)$$

Accordingly, a sub-block estimation of the original sub-vectors of symbols $s^{(k)}$, k=N, N−1, ..., 1 is performed recursively in step 408. An initialization is performed in step 407 corresponding to k=N.

Step 408 may be repeated for each sub-block $(SB)_k$, k=N, N−1, ... 1 to determine a sub-vector estimation $\hat{s}^{(k)}$ of the sub-vector of symbols $s^{(k)}$. For each index k=N−1, ..., 1, a sub-vector $\bar{y}^{(k)} = \tilde{y}^{(k)} - \Sigma_{j=k}^N B^{(k,j)}\hat{s}^{(j)}$ may be computed in step 417 from the previously estimated sub-vectors $\hat{s}^{(j)}$, j=k+1, ..., N and the rectangular matrices $B^{(k,j)}$, j=k+1, ..., N. An estimate of the sub-vector of index k may be determined using the decoding algorithm $D^{(k)}$, the upper triangular matrix $R^{(k)}$ and the calculated sub-vector $\bar{y}^{(k)}$. For k=N, the estimate $\hat{s}^{(N)}$ may be determined using the corresponding decoding algorithm $D^{(N)}$, the corresponding upper triangular sub-matrix $R^{(N)}$ and the vector $\bar{y}^{(N)} = \tilde{y}^{(N)}$ initialized in step 407.

If it is determined that all the sub-vectors of symbols have been estimated in step 410, step 411 may be performed to construct an output, from the sub-vectors $\hat{s}^{(k)}$, k=1, ..., N, as an estimation $\hat{s}_c$ of the transmitted signal. The construction step may comprise two phases. First, an estimate of the real vector $\hat{s} = [\hat{s}^{(1)}, ..., \hat{s}^{(N)}]^t$ may be constructed by aggregating the different estimates in the different sub-vectors. Then, the obtained vector may be converted into the complex vector $\hat{s}_c = [\hat{s}_1, \hat{s}_2, ..., \hat{s}_{n/2}]^t$ such that a component $\hat{s}_j$ for j=1, ..., n/2 is given by:

$$\hat{s}_j = (\hat{s})_j + i(\hat{s})_{j+n/2} \quad (19)$$

In equation (19), $(u)_j$ denotes the $j^{th}$ element of the vector u.

In certain embodiments of the invention, the target quality of service metric $(QoS)_t$ may be selected from a plurality of predefined values. The set of predefined values may be stored within the receiver in a storage unit 212 such as a look-up table. The storage unit 212 may further store the sub-block decoding parameters corresponding to each value of a target quality of service metric. The sub-block decoding parameters may comprise a number of sub-blocks, the length of each sub-block and the decoding algorithm implemented in the symbols estimation unit corresponding to each sub-block.

In one embodiment, the values of the target quality of service metric and their corresponding sub-block decoding parameters saved in the storage unit may be produced from a series of measurements or from simulations. Measurements of a quality of service metric may be taken continuously, periodically or over a sliding window of quality of service measurement observations. The sliding window of observations may be a function of the coherence time of the channel $T_c$ defined by the time during which a realization of the channel matrix $H_c$ remains constant.

In another embodiment, the values of the target quality of service metric may be fitted dynamically using a feedback controller 215. Steps 412 to 415 may be iterated to update the value of the current target quality of service metric $(QoS)_t$. Accordingly, step 412 may be performed to measure of a quality of service metric $(QoS)_m$ from at least the received signal and estimated information symbols.

If it is determined that the measured quality of service metric $(QoS)_m$ is larger than the current target quality of service metric $(QoS)_t$ (step 413), a quality of service indicator QSI may be generated in step 414. The generated quality of service indicator may be delivered to a processing unit (213) indicating to maintain or increase the current value of the target quality of service metric $(QoS)_t$.

If it is determined that the measured quality of service metric $(QoS)_m$ is lower than the current target quality of service metric (QoS)$_t$ (step 413), the generated quality of service indicator may indicate to decrease the current target quality of service metric (QoS)$_t$.

The quality of service indicator may be for example a 1-bit indicator having two states. A bit '0' may be correspond to maintaining or increasing the current target quality of service metric (QoS)$_t$. A bit '1' may correspond to decreasing the current target quality of service metric (QoS)$_t$.

In certain embodiments of the invention, the target quality of service metric (QoS)$_t$ may be chosen in a group consisting of the diversity order d$_t$, the symbol error rate SER$_t$ and the outage probability of the channel Pout$_t$.

In an embodiment where the target quality of service is measured in terms of error probability, the target quality of service metric SER$_t$ may correspond to the number of symbol errors per time unit. The metric SER$_t$ may be associated to a symbol error probability P$_{e,s}$ which indicates an expectation value of the symbol error ratio and is given by:

$$P_{e,s} = U_{i=1}^{n_t} Pr(\hat{s}_i \neq s_i) \quad (20)$$

In equation (20), $s_i$ and $\hat{s}_i$ denote respectively the transmitted and estimated symbols for i=1, ..., n$_t$.

In an embodiment where the target quality of service is measured in terms of the diversity order, the metric d$_t$ may indicate a preferred target reliability of the channel links and the different available degrees of freedom. Generally, an achievable diversity order d is reflected in the exponent of the average signal-to-noise ratio in the error probability equation. For example, when the error probability is measured using the symbol error probability P$_{e,s}$, the error probability equation of the system is expressed as:

$$P_{e,s} \approx \frac{a}{\gamma^d} \quad (21)$$

In equation (21), γ denotes the average signal-to-noise ratio, α designates for the signal-to-noise ratio gain and d corresponds to the achievable diversity order. The error probability decreases as the d$^{th}$ power of the average signal-to-noise ratio, corresponding to a slope of −d in the error probability curve (in dB scale) according to:

$$d = -\lim_{\gamma \to \infty} \left( \frac{\log_2(P_{e,s})}{\log_2(\gamma)} \right) \quad (22)$$

In applications of the present invention in wireless MIMO systems, the achievable diversity order d depends on the coding scheme at the transmitter and on the decoding scheme used at the receiver. The maximum achievable diversity order d$_{max}$ is obtained using optimal ML decoding and is equal to d$_{max}$=n$_r$ and d$_{max}$=T×n$_r$ for a spatial multiplexing scheme and coded scheme using a STBC of length T, respectively. Suboptimal linear (e.g. ZF or MMSE) and non-linear (e.g. ZF-DFE) receivers allow to achieve a diversity order d=1. Preprocessing techniques such as lattice reduction may be used prior to decoding for enhancing the achievable diversity order. For example, the LLL lattice reduction technique implemented prior to ZF or ZF-DFE decoding allows increasing the achievable diversity order to d=n$_r$ which coincides with the maximum achievable diversity order in a MIMO configuration using spatial multiplexing.

In another embodiment where the target quality of service is measured in terms of the outage probability of the channel, the metric Pout$_t$ indicates the probability that a given transmission rate R (bits/channel use) cannot be supported due to the variations of the channel. The probability of outage of the channel is expressed as:

$$Pout(R) = Pr(C(H) < R) \quad (23)$$

In equation (23), C(H) designates the instantaneous channel capacity expressed by:

$$C(H) = \mathbb{E}_H \left\{ \log_2 \left( \det \left( I_{n_r} + \frac{SNR}{n_t} HH^t \right) \right) \right\} \quad (24)$$

The outage probability of the channel indicates the ability to decode the original symbols according to the quality of the transmission channel. If the instantaneous channel capacity satisfies C(H)<R for a given transmission rate R, it is indicated that the channel quality is bad. As a result, the receiver may not be able to correctly decode the original symbols. If the instantaneous capacity is such that C(H)≥R, it is indicated that the channel is of good quality enabling correct recovery of the original symbols at the receiver side.

According to certain embodiments of the invention, the decoding algorithms D$^{(k)}$, implemented in the symbol estimation units 305 k=1, ..., N may be similar or different. A decoding algorithm D$^{(k)}$ may be, without limitations, any sequential decoder, a ZF, and MMSE or ZF-DFE decoder. Further, a preprocessing on the corresponding sub-upper triangular matrix R$^{(k)}$ prior to decoding using a lattice reduction such as LLL reduction and/or a left preprocessing using for example an MMSE-GDFE filtering may be performed. Preprocessing methods may be applied on the channel matrix prior to sub-block division and decoding according to certain embodiments of the invention.

In an embodiment where a sequential decoder is used in a given sub-block (SB)$_k$, the corresponding decoder D$^{(k)}$ attempts to deliver an estimate ŝ$^{(k)}$ by minimizing the sub-block metric m(s$^{(k)}$)=||ȳ$^{(k)}$−R$^{(k)}$s$^{(k)}$||$^2$ according to:

$$\hat{s}^{(k)} = \mathrm{argmin}_{s^{(k)} \in A^{l_k}} m(s^{(k)}) = \mathrm{argmin}_{s^{(k)} \in A^{l_k}} \| \bar{y}^{(k)} - R^{(k)} s^{(k)} \|^2 \quad (25)$$

Sequential tree-search algorithms such as the Sphere Decoder (SD), the Stack decoder or and the SB-Stack decoder (SB-Stack), may be used to solve equation (25).

Figure 5:
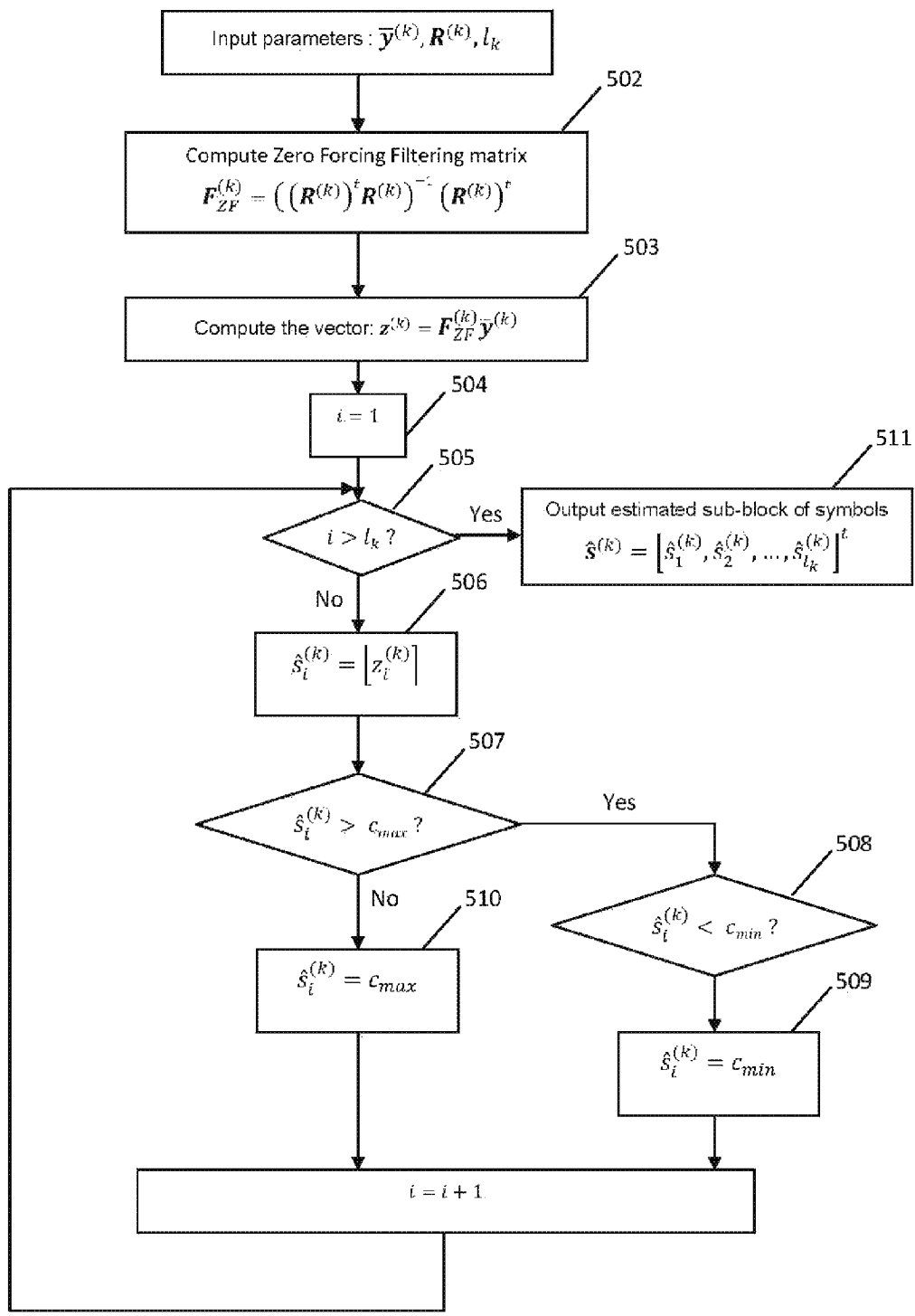
FIG. 5 is a flowchart of a method of sub-block decoding according to an exemplary embodiment of the present invention.

Referring to FIG. 5, there is illustrated a decoding algorithm D$^{(k)}$ using a linear ZF decoder. In step 502 the ZF filtering matrix F$_{ZF}^{(k)}$ may be determined according to:

$$F_{ZF}^{(k)} = ((R^{(k)})^t R^{(k)})^{-1} (R^{(k)})^t \quad (26)$$

In step 503, a vector z$^{(k)}$=F$_{ZF}$ȳ$^{(k)}$ may be computed using the filtering matrix and the sub-vector ȳ$^{(k)}$. Steps 504 to 511 may be then performed to determine the l$_k$ symbols ŝ$_1^{(k)}$, ŝ$_2^{(k)}$, ..., ŝ$_{l_k}^{(k)}$ starting from i=1 (in step 504). Accordingly, in step 506 an initial value of a symbol ŝ$_i^{(k)}$=⌊z$_i^{(k)}$⌉ may be set by rounding the i$^{th}$ entry of the vector z$^{(k)}$ to the nearest integer. Steps 507 and 508 may be performed to determine if this initial value belongs to the alphabet A=[c$_{min}$,c$_{max}$]. If it is determined in step 507 that the initial value of ŝ$_i^{(k)}$ is larger than the bound c$_{max}$, an update is made in step 510 to obtain ŝ$_i^{(k)}$=c$_{max}$. If it is determined in step 507 that the initial value of ŝ$_i^{(k)}$ is lower than the bound c$_{max}$, step 508 is performed. If it is determined in step 508 that the initial value of $\hat{s}_i^{(k)}$ is smaller than the bound $c_{min}$, indicating that the initial value of $\hat{s}_i^{(k)}$ is outside the alphabet A, step 509 may be performed to update this value to $\hat{s}_i^{(k)} = c_{min}$.

If it is determined that all the $l_k$ symbols $\hat{s}_1^{(k)}, \hat{s}_2^{(k)}, \ldots, \hat{s}_{l_k}^{(k)}$ have been estimated (in step 505), the vector $\hat{s}^{(k)} = [\hat{s}_1^{(k)}, \hat{s}_2^{(k)}, \ldots, \hat{s}_{l_k}^{(k)}]^t$ is output in step 511 as an estimate of the corresponding sub-vector $s^{(k)}$.

Figure 6:
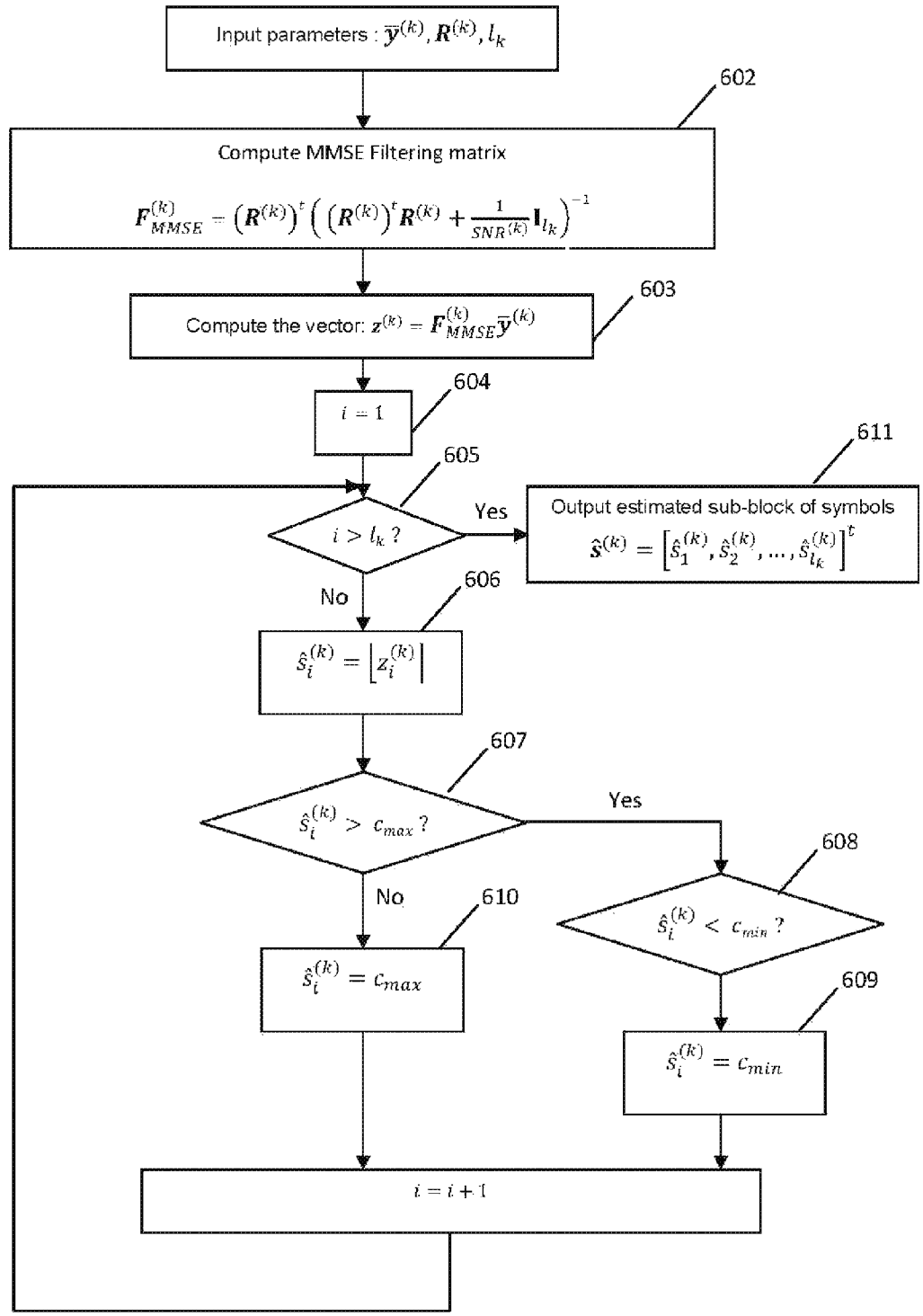
FIG. 6 is a flowchart of a method of sub-block decoding according to an exemplary embodiment of the present invention.

Referring to FIG. 6, there is illustrated a decoding algorithm $D^{(k)}$ using a linear MMSE decoder. In step 602 the MMSE filtering matrix $F_{MMSE}^{(k)}$ may be determined as:

$$F_{MMSE}^{(k)} = (R^{(k)})^t \left( (R^{(k)})^t R^{(k)} + \frac{1}{SNR^{(k)}} I_{l_k} \right)^{-1} \quad (27)$$

In step 603, a vector $z^{(k)} = F_{MMSE}^{(k)} \bar{y}^{(k)}$ may be computed using the filtering matrix and the sub-vector $\bar{y}^{(k)}$. Steps 604 to 611 may be performed to determine the $l_k$ symbols $\hat{s}_1^{(k)}, \hat{s}_2^{(k)}, \ldots, \hat{s}_{l_k}^{(k)}$ starting from i=1 (in step 604). Accordingly, in step 606 an initial value of a symbol $\hat{s}_i^{(k)} = \lfloor z_i^{(k)} \rceil$ may be set by rounding the $i^{th}$ entry of the vector $z^{(k)}$ to the nearest integer. Steps 607 and 608 are performed to determine if this initial value belongs to the alphabet $A = [c_{min}, c_{max}]$. If it is determined in step 607 that the initial value of $\hat{s}_i^{(k)}$ is larger than the bound $c_{max}$, an update is made in step 610 to obtain $\hat{s}_i^{(k)} = c_{max}$. If it is determined in step 607 that the initial value of $\hat{s}_i^{(k)}$ is lower than the bound $c_{max}$, step 608 is performed. If it is determined in step 608 that the initial value of $\hat{s}_i^{(k)}$ is smaller than the bound $c_{min}$ indicating that the initial value of $\hat{s}_i^{(k)}$ is outside the alphabet A, step 609 is performed to update this value to $\hat{s}_i^{(k)} = c_{min}$.

If it is determined that all the $l_k$ symbols $\hat{s}_1^{(k)}, \hat{s}_2^{(k)}, \ldots, \hat{s}_{l_k}^{(k)}$ have been estimated (in step 605), the vector $\hat{s}^{(k)} = [\hat{s}_1^{(k)}, \hat{s}_2^{(k)}, \ldots, \hat{s}_{l_k}^{(k)}]^t$ is output in step 611 as an estimate of the correspondence sub-vector $s^{(k)}$.

The methods and devices described herein may be implemented by various means. For example, these techniques may be implemented in hardware, software, or a combination thereof. For a hardware implementation, the processing elements of a Space-Time decoder 110 can be implemented for example according to a hardware-only configuration (for example, in one or more FPGA, ASIC or VLSI integrated circuits with the corresponding memory) or according to a configuration using both VLSI and DSP.

Figure 7:
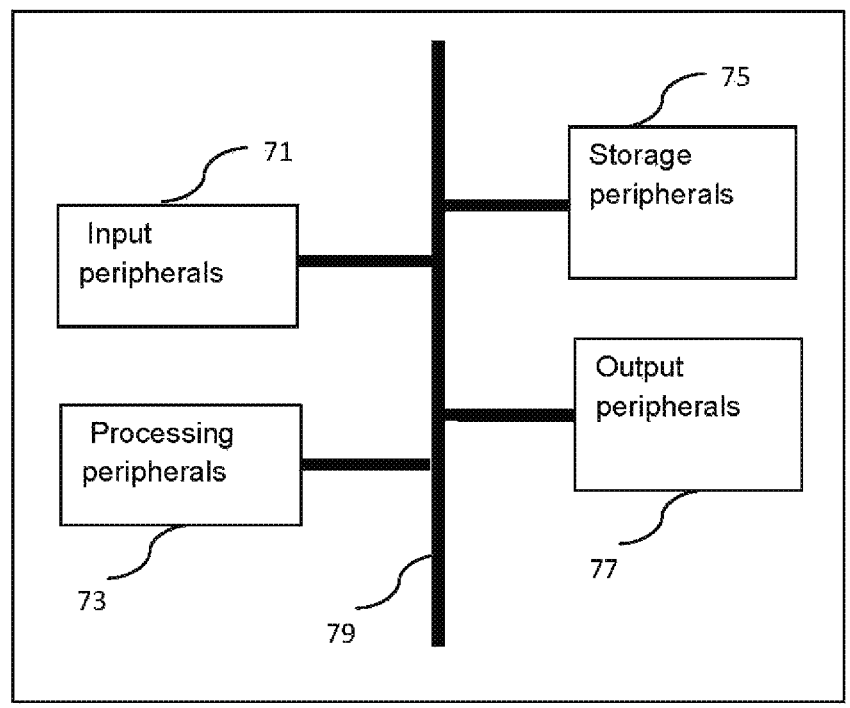
FIG. 7 illustrates a hardware architecture of a Space-Time decoder implementing specific embodiments of the invention.

FIG. 7 represents a non-exhaustive and non-limiting exemplary hardware architecture 70 of the Space-Time decoder 110 according to certain embodiments of the invention. The hardware architecture 70 may be implemented in a machine or computer executed device. As illustrated, the Space-Time decoder 110 may include various computing, storage and communication units possibly interacting with one another through a data and address port 79 and comprising:

- Input peripherals 71 for receiving for example input data from the receive antennas 108;
- Processing peripherals 73 comprising one or more microprocessors (CPU) such as an FPGA or an ASIC configured for example to execute the corresponding instructions to run the methods and algorithms according to the various embodiments of the invention;
- Storage peripherals 75 possibly comprising a random access memory (RAM) or a read-only memory to store for example the sub-block decoding parameters and the set of values of the target quality of service metric.
- Output peripherals 77 comprising communication means such as displays enabling for example man-to-machine interaction between the receiver device 11 and a MIMO system administrator for configuration and maintenance purposes.

While embodiments of the invention have been illustrated by a description of various examples, and while these embodiments have been described in considerable detail, it is not the intent of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Further, the various embodiments of the invention are not limited to particular types of recursive sub-block decoding, and apply to any other types of sub-block decoding such as Semi-exhaustive Recursive Block decoding disclosed in the patent application EP No 15306808.5. Further, the various embodiments of the invention apply both to hard and soft decoding.

In one application to soft decoding, methods and devices according to the invention allow generating a list of estimates of the original vector of information symbols. The obtained list can be used to calculate the log likelihood ratio values for approximating the extrinsic information of the different information bits carried by the original information symbols. Several iterations of steps 408 to 415 may be performed in order to fill the list of estimates.

Further, while certain embodiments of the invention have been described in relation to a wireless single-user MIMO system, it should be noted that the invention is not limited to such application. The invention may be integrated in any receiver device operating in any linear communication system characterized by a lattice representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular uplink communications applied in 3G, 4G and LTE standards. Cooperative communications applied for example in ad-hoc networks (wireless sensor networks, machine-to-machine communications, internet of things . . . ) are also examples of distributed MIMO systems. In addition to wireless networks, the present invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, certain embodiments of the invention may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A decoder for sub-block decoding a data signal received through a transmission channel in a communication system, said transmission channel being represented by an upper triangular matrix, said data signal carrying transmitted symbols, each symbol carrying a set of information bits, wherein said decoder comprises:
a processing unit configured to determine at least one sub-block decoding parameter given a target quality of service metric;
A sub-block decoding unit configured to divide said data signal into a number of sub-vectors based on said at least one sub-block decoding parameter in accordance with a division of said upper triangular matrix into a number of sub-matrices, said sub-block decoding unit being further configured to determine at least one estimate of each sub-vector of transmitted symbols from said sub-vectors, and determine an estimate of the transmitted symbols from said estimates.

2. The decoder of claim 1, wherein said target quality of service metric is chosen among a group consisting of the diversity order, symbol error rate and a channel outage probability.

3. The decoder of claim 1, wherein it comprises a storage unit configured to store a look-up table comprising a set of values, said processing unit being configured to determine said at least one sub-block decoding parameter from said set of values.

4. The decoder of claim 3, wherein said storage unit is further configured to update said look-up table from a set of quality of service measurements in response to a temporal condition.

5. The decoder of claim 4, wherein said temporal condition is chosen among a group consisting of a period and a sliding window.

6. The decoder of claim 1, wherein said processing unit is further configured to determine a quality of service indicator based on a comparison between a measured quality of service metric and said target quality of service metric, said quality of service indicator having a value among a first value and a second value, said processing unit being further configured to update said target quality of service metric depending on the value of said quality of service indicator.

7. The decoder of claim 6, wherein said processing unit being configured to decrease the target quality of service metric if the quality of service indicator has the first value and to increase or maintain the target quality of service metric if the quality of service indicator has the second value.

8. The decoder of claim 6, wherein said quality of service indicator is a binary indicator.

9. The decoder of claim 1, wherein said processing unit is further configured to update said at least one sub-block decoding parameter in response to the update of said target quality of service metric.

10. The decoder of claim 1, wherein said at least one sub-block decoding parameter comprises at least one parameter chosen among a group consisting of a number of sub-blocks being greater than or equal to two, the length of each sub-block and the decoding algorithm implemented in each sub-block.

11. The decoder of claim 1, wherein said sub-block decoding unit is configured to determine said at least one estimate of each sub-vector using a same decoding algorithm.

12. The decoder of claim 1, wherein said sub-block decoding unit is configured to determine said at least one estimate of each sub-vector using a different decoding algorithm for each sub-vector.

13. The decoder of claim 1, wherein at least one decoding algorithm is chosen among a group consisting of a sequential decoding algorithm, a ZF decoding algorithm, an MMSE decoding algorithm and a ZF-DFE decoding algorithm.

14. The decoder of claim 1, wherein the sub-block decoding unit is further configured to perform a preprocessing using at least one of a lattice reduction and an MMSE-GDFE filtering.

15. The decoder of claim 1, wherein said sub-block decoding unit is configured to determine a plurality of estimates of each sub-vector of transmitted information symbol for delivering soft-outputs decisions on said sets of information bits.

16. The decoder of claim 1, wherein the communication system is a multiple-input multiple-output communication system represented by an equivalent channel matrix.

17. The decoder of claim 1, wherein said upper triangular matrix is determined from a QR decomposition of the equivalent channel matrix.

18. The decoder of claim 1, wherein said upper triangular matrix is determined from a QR decomposition of a permuted equivalent channel matrix.

19. The decoder of claim 1, wherein said upper triangular matrix is determined from a QR decomposition of a preprocessed equivalent channel matrix using a lattice reduction and/or an MMSE-GDFE filtering.

20. A receiver for receiving and decoding a data signal carrying transmitted information symbols, wherein the receiver comprises a decoder according to claim 1 configured to decode transmitted information symbols.

21. A wireless device capable of receiving a data signal carrying transmitted information symbols in a wireless multiple-input multiple-output communication system, wherein the wireless device comprises a receiver according to claim 20 configured to receive and decode transmitted information symbols.

22. An optical device capable of receiving a data signal carrying transmitted information symbols in an optical multiple-input multiple-output communication system, wherein the optical device comprises a receiver according to claim 20 configured to receive and decode said transmitted information symbols.

23. A method of sub-block decoding a data signal received through a transmission channel in a communication system, said transmission channel being represented by an upper triangular matrix, said signal carrying transmitted symbols, each symbol carrying a set of information bits, wherein said method comprises:
- determining at least one sub-block decoding parameter given a target quality of service metric;
- dividing said data signal into a number of sub-vectors based on said at least one sub-block decoding parameter in accordance with a division of said upper triangular matrix into a number of sub-matrices, determining at least one estimate of each sub-vector of transmitted symbols from said sub-vectors, and determining an estimate of the transmitted symbols from said estimates.

24. A computer program product for sub-block decoding a data signal received through a transmission channel in a communication system, said transmission channel being represented by an upper triangular matrix, said signal carrying transmitted symbols, each symbol carrying a set of information bits, the computer program product comprising:
- a non-transitory computer readable storage medium; and instructions stored on the non-transitory computer readable storage medium that, when executed by a processor, cause the processor to:
- determine at least one sub-block decoding parameter given a target quality of service metric;
- divide said data signal into a number of sub-vectors based on said at least one sub-block decoding parameter in accordance with a division of said upper triangular matrix into a number of sub-matrices, determine at least one estimate of each sub-vector of transmitted symbols from said sub-vectors, and determine an estimate of the transmitted symbols from said estimates.

* * * * *